(12) United States Patent
Willer

(10) Patent No.: US 6,377,665 B1
(45) Date of Patent: Apr. 23, 2002

(54) APPARATUS AND METHOD OF IMPLEMENTING A UNIVERSAL HOME NETWORK ON A CUSTOMER PREMISES UPN TELEPHONE LINES

(75) Inventor: Bernd Willer, Moosburg (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/568,181

(22) Filed: May 9, 2000

(51) Int. Cl.⁷ .............................................. H04M 11/00
(52) U.S. Cl. ................................. 379/90.01; 379/93.05; 379/93.06
(58) Field of Search .......................... 379/90.01, 93.01, 379/93.05, 93.06, 93.09, 156, 165, 196, 197, 198; 370/488, 485

(56) References Cited

U.S. PATENT DOCUMENTS 5,841,841 A  * 11/1998  Dodds et al. ............. 379/90.01
6,088,368 A  * 7/2000  Rubinstain et al. ......... 370/480

OTHER PUBLICATIONS

Data Sheet, "Siemens ICs for Communications: Octal Transceiver for UPN Interfaces OCTAT–P, PEB 2096", Jan. 1996, pp. 1–62, Version 1.3 (T2096–V13–D2–7600), Munich Germany (author unknown).

Product Overview, "Siemens ICs for Communications: DSP Oriented PBX Controller DOC PEB 20560", Nov. 1997, pp. 1–34, Version 2.1 (DS1), Munich Germany (author unknown).

* cited by examiner

*Primary Examiner*—Stella Woo
*Assistant Examiner*—Melur. Ramakrishnaiah
(74) *Attorney, Agent, or Firm*—Manelli Denison & Selter PLLC

(57) ABSTRACT

A customer premises system having two-wire buses for transmission of digital telephony signals between a private branch exchange (PBX) and respective end equipment units includes low pass filters coupled to PBX and end equipment unit terminal ends of the two-wire buses, for isolation of a home PNA signal from the end equipment units and the PBX, and a high pass filter configured for cross coupling the home PNA signal across the two-wire buses.

18 Claims, 3 Drawing Sheets

APPARATUS AND METHOD OF IMPLEMENTING A UNIVERSAL HOME NETWORK ON A CUSTOMER PREMISES UPN TELEPHONE LINES

BACKGROUND OF THE INVENTION

1. Field of the Invention

The present invention relates to network interfacing, and more particularly to methods and systems for controlling transmission of data between network stations connected to a telephone line medium.

2. Background Art

Local area networks use a network cable or other media to link stations on the network. Each local area network architecture uses a media access control (MAC) enabling network interface cards at each station to share access to the media Conventional local area network architectures use a media access controller operating according to half-duplex or full duplex Ethernet (ANSI/IEEE standard 802.3) protocol using a prescribed network medium, such as 10BaseT. Newer operating systems require that a network station be able to detect the presence of the network. In an Ethernet 10BaseT environment, the network is detected by the transmission of a link pulse by the physical layer (PHY) transceiver. The periodic link pulse on the 10BaseT media is detected by a PHY receiver, which determines the presence of another network station transmitting on the network medium based on detection of the periodic link pulses. Hence, a PHY transceiver at station A is able to detect the presence of station B, without the transmission or reception of data packets, by the reception of link pulses on the 10BaseT medium from the PHY transmitter at station B.

Efforts are underway to develop an architecture that enables computers to be linked together using conventional twisted pair telephone lines instead of established local area network media such as 10BaseT. Such an arrangement, referred to herein as a home network environment, provides the advantage that existing telephone wiring in a home may be used to implement a home network environment However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air-conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak to peak voltage on the order of 10 to 20 millivolts, whereas network signals from another network station may have a value on the order of one to two volts. Hence, the amplitude and shape of a received pulse may be so distorted that recovery of a transmitted clock or transmit data from the received pulse becomes substantially difficult.

An additional problem encountered in European telephone systems involves the use of a network termination basic access (NTBA) device, used as an interface between the residential customer premises and a central office of the public switched telephone network for transmission of Integrated Services Digital Network (ISDN)-based signals. In particular, NTBA devices map a two wire ISDN signal from a central office into a four wire S0 bus having a two wire send path and a two wire receive path for sending and receiving the ISDN-based signals throughout a customer premises.

Another transmission scheme is the use of 2-wire UPN lines as an alternative to analog POTS lines or the S0 bus lines. UPN is a digital transmission scheme used in modern PBX systems and having the advantage of enabling intelligent digital phones to be connected to a PBX via two wires instead of the four wire S0 bus. In particular, the UPN protocol has a data rate of 384 kbps, and a 38-bit frame structure that uses AMI coding for data transmission.

Numerous problems are encountered if one attempts to supply home PNA network signals in a customer premises having two-wire UPN lines for digital telephony. In particular, the PBX systems using two wire UPN lines connect the end equipment (e.g., the digital telephones) in a star configuration. Consequently, home PNA signals transmitted from one end equipment to another end equipment would suffer substantial signal loss during transmission through the PBX, especially since the PBX is not configured for passing home PNA signals. In addition, the 384 kbps UPN signal has a number of harmonics above the 384 kHz base signal that may interfere with the home PNA signals. Further, the home PNA signal, transmitted for example at a frequency of 7.5 MHz, may interfere with the PBX equipment or the end equipment, adversely affecting reliable transmission and reception of the UPN digital signals. Finally, capacitive influences on the two wire UPN lines may adversely affect the home PNA signals, limiting the effective transmission distance between two network stations.

SUMMARY OF THE INVENTION

There is need for an arrangement for interconnecting computer end stations in a home telephone network having a private branch exchange (PBX) and configured for sending UPN-based signals on a two-wire bus.

There is also a need for arrangement for transmitting home PNA signals of a home telephone network, in a customer premises having a private branch exchange (PBX) and configured for sending UPN-based digital telephony signals on a two-wire bus, in a manner that optimizes transmission of the home PNA signal without interference with the UPN-based digital telephony signals.

These and other needs are attained by the present invention, where a customer premises system having two-wire buses for transmission of digital telephony signals between a private branch exchange and respective end equipment units includes low pass filters coupled to PBX and end equipment unit terminal ends of the two-wire buses, for isolation of a home PNA signal from the end equipment units and the PBX, and a high pass filter configured for cross coupling the home PNA signal across the two wire buses.

One aspect of the present invention provides a method of implementing a local area network in a customer premises telephone network. The customer premises telephone network has a plurality of end equipment units having respective end equipment unit terminal ends, a private branch exchange (PBX) having PBX terminal ends, and a plurality of two-wire buses. The two-wire buses are configured for connecting the end equipment unit terminal ends to the PBX terminal ends, respectively, for transmission of UPN protocol digital signals between the PBX and the end equipment units. The method includes connecting low pass filters, each configured for passing the UPN protocol digital signals and rejecting a local area network signal, at each PBX terminal end and each end equipment terminal end of a corresponding two-wire bus, each two-wire bus having a first node between the corresponding two connected low pass filters. The method also includes connecting a high pass filter, configured for passing the local area network signal and rejecting the UPN protocol digital signals, across each of the two-wire buses at the corresponding first node. The local area network signal is then transmitted from a first network node on a corresponding first of the two-wire buses at the corresponding first node.

Connection of the low pass filters at each PBX terminal end and each end equipment terminal end ensures that the PBX and the end equipment units are able to send and receive UPN protocol digital signals without interference from the local area network signal. In addition, the low pass filters limit the UPN protocol digital signals, providing a distortion-free transmission medium for the higher frequency local area network signal. Moreover, connecting the high pass filter across each of the two-wire buses at the corresponding first node enables the local area network signal to bypass the PBX without introducing crossover of the UPN protocol digital signals. Finally, the low pass filters and the high pass filter can be configured to minimize the capacitance encountered by the local area network signal on the two-wire buses, improving transmission performance and enabling the network length between two network nodes to be substantially increased Another aspect of the present invention provides a computer network. The computer network includes a private branch exchange (PBX) having PBX terminal ends and configured for sending and receiving UPN protocol digital telephony signals, a plurality of end equipment units each having an end equipment unit terminal end and configured for sending and receiving the UPN protocol digital telephony signals, and a plurality of two-wire buses configured for connecting the end equipment unit terminal ends to the PBX terminal ends, respectively. Each two-wire bus has a first low pass filter connected at the corresponding end equipment unit terminal and a second low pass filter connected at the corresponding PBX terminal end. The first and second low pass filters are configured for passing the UPN protocol digital telephony signals and rejecting computer network signals. Each two-wire bus also has a connection node between the corresponding first and second low pass filters for a corresponding network node, where a high pass filter is configured for passing the computer network signals across the two-wire buses at the respective connection nodes.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
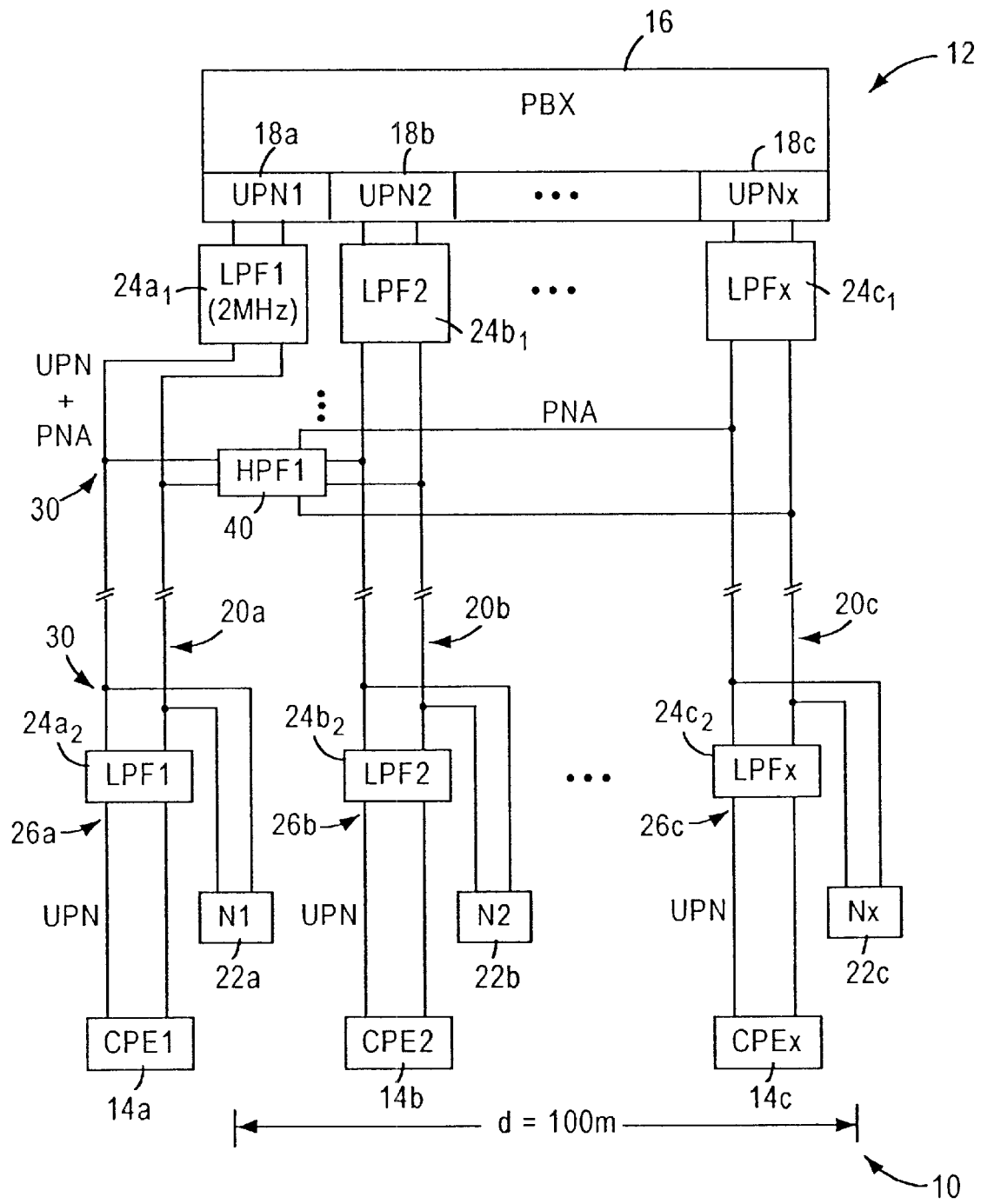
FIG. 1 is a block diagram illustrating a computer network implemented in a customer premises having UPN-based wiring according to an embodiment of the present invention.

FIG. 1 is a block diagram illustrating an Ethernet (IEEE 802.3) local area computer network 10 implemented in a customer premises telephone network 12 using UPN-based signals according to an embodiment of the present invention. As shown in FIG. 1, the customer premises telephone network 12 includes a plurality of end equipment units 14, also referred to as customer premises equipment (CPE), a private branch exchange (PBX) 16 having UPN protocol-compliant PBX terminal ends 18 for sending and receiving UPN protocol digital telephony signals, and two-wire buses 20 configured for connecting the PBX terminal ends 18 to the respective end equipment units 14.

The local area computer network includes network nodes 22, for example computer workstations, configured for sending and receiving IEEE 802.3 type data packets according to the home PNA protocol specified by the Home Phone Network Alliance.

Conventional attempts to transmit home PNA type signals between the network nodes 22 via the customer premises telephone network 12 would be unsuccessful, since the PBX 16 is not configured for transmitting the 7.5 MHz home PNA signal. In addition, the digital UPN protocol signals transmitted at 384 kbps generate harmonics above 384 kHz baseband frequency, resulting in interference with the home PNA signal.

Figure 2:
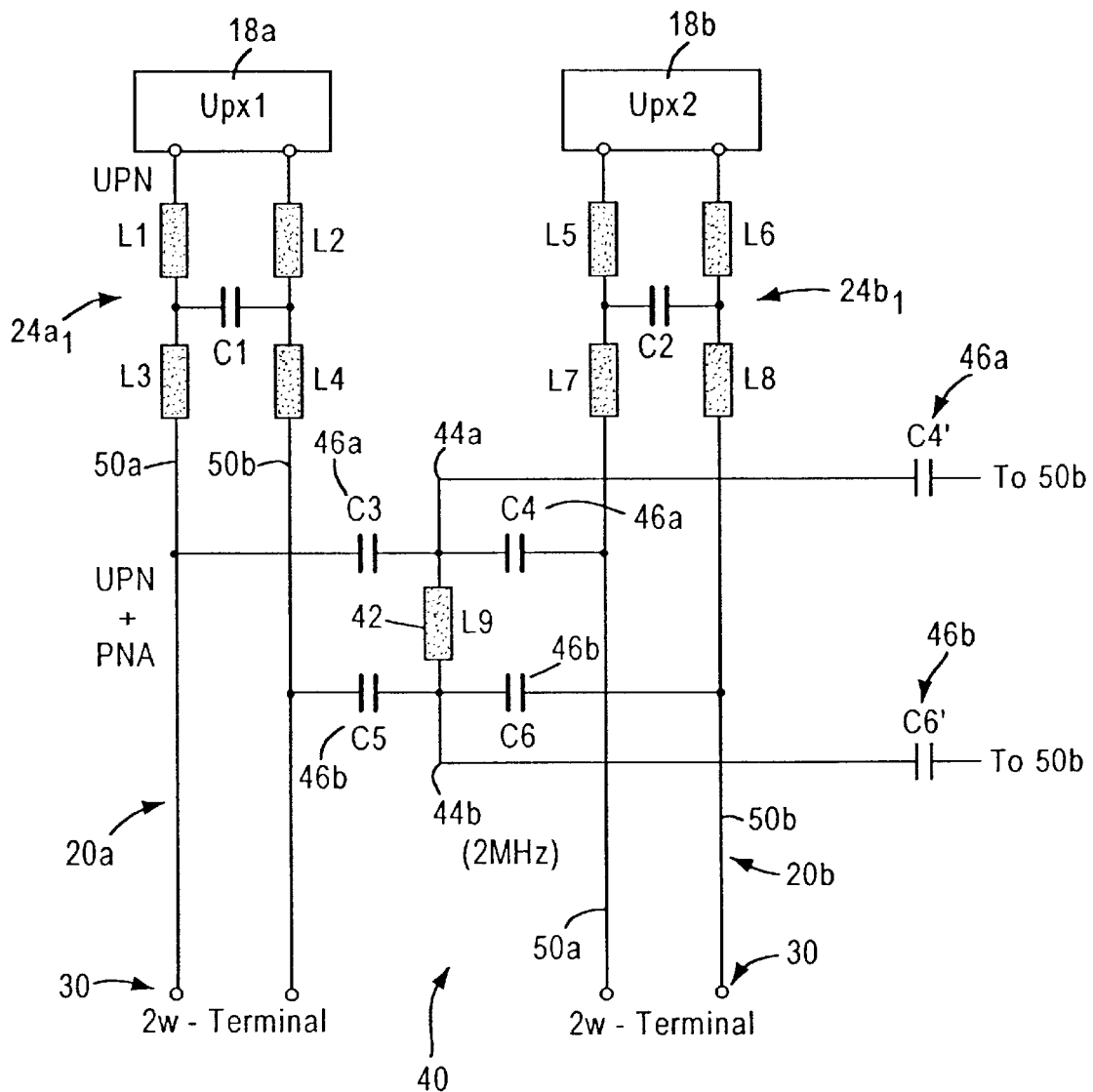
FIG. 2 is a diagram illustrating in detail the low pass filters and the high pass filter coupled at the terminal ends of the PBX of FIG. 1.
Figure 3:
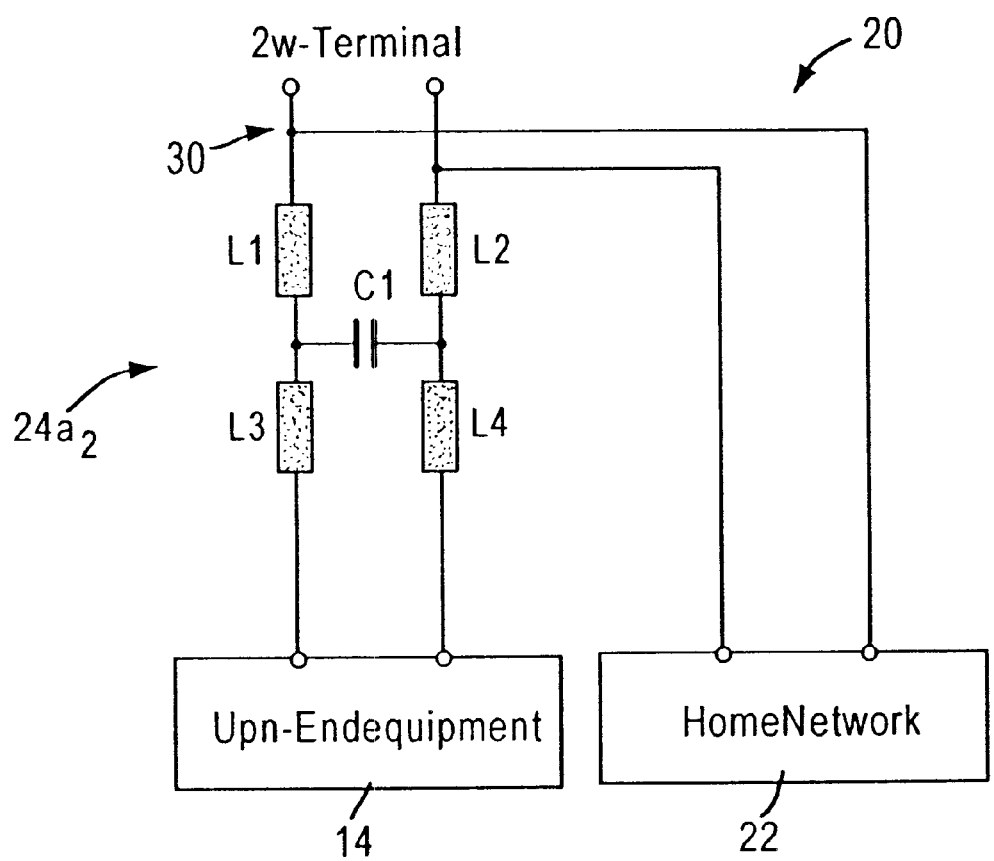
FIG. 3 is a diagram illustrating the low pass filter and the coupling node on a two wire UPN bus for the end equipment unit and the network node, respectively.

According to the disclosed embodiment, low pass filters 24 are connected at each PBX terminal end 18 and each end equipment terminal end 26 of each two wire bus 20 to band limit the UPN protocol digital signals and reject the home PNA network signals. In particular, each low pass filter 24, illustrated in further detail in FIGS. 2 and 3, is configured to have a −3 dB cutoff frequency of about 2 MHz, with an attenuation of about −13 dB/octave. Hence, the 2 MHz cutoff frequency for the low pass filters 24 enables substantially all of the information in the 384 kbps UPN protocol digital signals to be passed, while band limiting the UPN protocol digital signals to avoid unnecessary signal distortion within the shared transmission region, defined by a connection node 30 positioned between the low pass filter (e.g., $24a_1$) coupled to the PBX terminal end (e.g., $18a$), and the low pass filter (e.g., $24a_2$) coupled to the end tint equipment unit terminal end (e.g., $26a$).

In addition, the 2 MHz cutoff frequency for the low pass filters 24 ensures that the 7.5 MHz home PNA signals do not interfere with the PBX 16 or the telephony and equipment units 14. Hence, the low pass filters 24 enable the end equipment units 14 to send and receive UPN protocol digital signals via the PBX 16, without interference by home PNA signals transmitted on the two wire buses 20 via the connecting nodes 30.

The computer network 10 also includes a high pass filter 40 configured for passing the computer network home PNA signals across the two wire buses 20 at the respective connection nodes 30, bypassing the PBX 16. In particular, the high pass filter 40, illustrated in detail in FIG. 2, has a −3 dB cutoff frequency of at least about 2 MHz for passing the home PNA network signal and rejecting the UPN protocol digital sis. As shown in FIG. 2, the high pass filter 40 has an inductor 42 (L9) having a first inductor terminal end 44a and a second inductor terminal end 44b, also referred to as filter nodes. The high pass filter 40 also includes, for each two wire bus 20, first and second connecting capacitors 46a and 46b configured for connecting first and second wires 50a and 50b to the fist and second inductor terminal ends 44a and 44b, respectively. For example, the capacitor 46a (C3) connects the first wire 50a of the two-wire bus 20a to the first inductor terminal end 44a, whereas the capacitor 46a (C4) connects the first wire 50a of the two-wire bus 20b to the first inductor terminal end 44a Similarly, the capacitor 46b (C5) connects the second wire 50b of the two-wire bus 20a to the second inductor terminal end 44b, whereas the capacitor 46b (C6) connects the second wire 50b of the two-wire bus 20b to the second inductor terminal end 44b. The number of two wire buses 20 to be connected to the high pass filter 40 via a corresponding set of connecting capacitors 46a and 46b depends on the time constant ($\tau$) and impedances of the filter elements versus the home PNA signal frequency.

FIG. 3 illustrates the end equipment unit 14 and the home network node 22 connected to the two wire bus 20. In particular, the end equipment 14 is connected to the two wire bus 20 via the low pass filter 24, ensuring that the UPN protocol digital telephony signal is band limited to 2 MHz, and that the 7.5 MHz home PNA signal does not reach the end equipment 14. As shown in FIG. 3, the network node 22 is directly coupled to the connection node 30 for transmission of the home PNA network signals between the low pass filters 24. Hence, the band limited UPN signal on the connection node 30 does not adversely affect the network node 22. In cases of high noise such as EMI from the computer having the home PNA card 22, a high pass filter nay be used to minimize the noise encountered at the node 30.

Hence, the disclosed arrangement enables UPN protocol digital telephony signals and home PNA network signals to be transmitted on the two wire bus 20 without causing any mutual interference. The low pass filters 24 band limit the UPN protocol digital telephony signals to prevent interference with the home PNA signals transmitted and received by the home network nodes 22. The low pass filters 24 also reject the home PNA signals, ensuring that only the UPN protocol digital telephony signals are detected by the PBX 16 and the end equipment units 14. In addition, the low pass filters 24 are configured to minimize the capacitive influence of the PBX 16 and the UPN nodes 14 of the two wire buses 20, minimizing attenuation of the home PNA signals in order to provide an optimum transmission medium for transmission between network stations for a distance (d) of up to about 100 meters. Finally, the use of the high pass filter 40 enables the home PNA signals to bypass the PBX 16 and the low pass filters 24 coupled to the PBX, without passing the UPN protocol digital telephony signals.

While this invention has been described with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of implementing a local area network in a customer premises telephone network having a plurality of end equipment units having respective end equipment unit terminal ends, a private branch exchange (PBX) having PBX terminal ends, and a plurality of two-wire buses configured for connecting the end equipment unit terminal ends to the PBX terminal ends, respectively, for transmission of UPN protocol digital signals between the PBX and the end equipment units, the method comprising:

connecting low pass filters, each configured for passing the UPN protocol digital signals and rejecting a local area network signal, at each PBX terminal end and each end equipment terminal end of a corresponding two-wire bus, each two-wire bus having a first node between the corresponding two connected low pass filters;

connecting a high pass filter, configured for passing the local area network signal and rejecting the UPN protocol digital signals, across each of the two-wire buses at the corresponding first node;

transmitting the local area network signal from a first network node on a corresponding first of the two-wire buses at the corresponding first node.

2. The method of claim 1, further comprising receiving the local area network signal by a second network node on a corresponding second of the two-wire buses at the corresponding first node.

3. The method of claim 2, wherein the step of connecting a low pass filter includes setting a −3 dB cutoff frequency of each low pass filter to a frequency of up to about 2 MHz.

4. The method of claim 3, wherein the step of connecting a high pass filter includes setting a −3 dB cutoff frequency of the high pass filter to a frequency of at least about 2 MHz for passing the local area network signal and rejecting the UPN protocol digital signals.

5. The method of claim 4, wherein the transmitting step includes transmitting the local area network signal from the first network node to the second network node across a distance of about 100 meters.

6. The method of claim 2, wherein:

the transmitting step includes coupling the first network node to the corresponding first node on the first of the two-wire buses for bypassing the low pass filter coupled to the corresponding end equipment terminal end; and the receiving step includes coupling the second network node to the corresponding first node on the second of the two-wire buses for bypassing the low pass filter coupled to the corresponding end equipment terminal end.

7. The method of claim 6, further comprising concurrently transmitting the UPN digital signals on the two-wire buses with the local area network signal.

8. The method of claim 2, wherein the step of connecting a high pass filter includes:

coupling first terminal ends of first and second capacitors to respective first and second wires of the first of the two wire buses at the respective first nodes;

coupling second terminal ends of the first and second capacitors to respective terminal ends of an inductor to form first and second filter nodes, respectively;

coupling first terminal ends of third and fourth capacitors to respective first and second wires of the second of the two wire buses at the respective first nodes; and coupling second terminal ends of the third and fourth capacitors to the first and second filter nodes, respectively.

9. The method of claim 8, wherein the step of connecting a high pass filter further includes coupling first and second wires of each of the two-wire buses to the respective first and second filter nodes using first and second connecting capacitors, respectively.

10. The method of claim 1, wherein the step of connecting the low pass filters and connecting the high pass filter each comprise configuring the corresponding filter for minimizing a capacitive influence, induced by the PBX and the end equipment units, encountered by the local area network signal on the corresponding two-wire bus.

11. A computer network comprising:
   a private branch exchange (PBX) having PBX terminal ends and configured for sending and receiving UPN protocol digital telephony signals;
   a plurality of end equipment units each having an end equipment unit terminal end and configured for sending and receiving the UPN protocol digital telephony signals;
   a plurality of two-wire buses configured for connecting the end equipment unit terminal ends to the PBX terminal ends, respectively, each two-wire bus having a first low pass filter connected at the corresponding end equipment unit terminal and a second low pass filter connected at the corresponding PBX terminal end, the first and second low pass filters configured for passing the UPN protocol digital telephony signals and rejecting computer network signals, each two-wire bus further having a connection node between the corresponding first and second low pass filters for a corresponding network node; and
   a high pass filter configured for passing the computer network signals across the two-wire buses at the respective connection nodes.

12. The computer network of claim 11, wherein each of the low pass filters and the high pass filter are configured for minimizing capacitive influence, induced by the PBX and the end equipment units, encountered by the computer network signals on the two-wire buses.

13. The computer network of claim 12, wherein the two-wire buses are configured with the PBX to provide a maximum distance between any of the network nodes of up to about 100 meters.

14. The computer network of claim 11, wherein each low pass filter is configured for a −3 dB cutoff frequency of up to about 2 MHz.

15. The computer network of claim 14, wherein the high pass filter is configured for a −3 dB cutoff frequency of at least about 2 MHz for rejecting the UPN protocol digital telephony signals.

16. The computer network of claim 11, wherein the high pass filter includes:
   an inductor having first and second inductor terminal ends; and
   first and second connecting capacitors for each two wire bus, the first and second connecting capacitors configured for connecting first and second wires of the corresponding two wire bus to the first and second inductor terminal ends, respectively.

17. The method of claim 1, wherein the transmitting step includes transmitting the local area network signal according to home PNA protocol.

18. The computer network of claim 11, wherein the computer network signals are transmitted according to home PNA protocol.

* * * * *